United States Patent
Naitou et al.

(10) Patent No.: US 9,827,681 B2
(45) Date of Patent: Nov. 28, 2017

(54) HUMAN COOPERATION ROBOT SYSTEM IN WHICH ROBOT IS CAUSED TO PERFORM RETREAT OPERATION DEPENDING ON EXTERNAL FORCE

(71) Applicant: FANUC Corporation, Yamanashi (JP)

(72) Inventors: Yasuhiro Naitou, Yamanashi (JP); Soichi Arita, Yamanashi (JP); Hiromitsu Takahashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 4 days.

(21) Appl. No.: 15/047,633

(22) Filed: Feb. 19, 2016

(65) Prior Publication Data
US 2016/0243705 A1    Aug. 25, 2016

(30) Foreign Application Priority Data

Feb. 20, 2015   (JP) ................................. 2015-032172

(51) Int. Cl.
 *B25J 13/08*   (2006.01)
 *G01L 5/00*    (2006.01)

(52) U.S. Cl.
 CPC ............. *B25J 13/085* (2013.01); *G01L 5/009* (2013.01)

(58) Field of Classification Search
 None
 See application file for complete search history.

(56) References Cited

U.S. PATENT DOCUMENTS

| | | | | |
|---|---|---|---|---|
| 6,057,661 A * | 5/2000 | Iwashita | ................ | H02P 23/16 318/280 |
| 2008/0231221 A1* | 9/2008 | Ogawa | .................... | B25J 5/007 318/568.12 |
| 2010/0152896 A1 | 6/2010 | Komatsu et al. | | |
| 2010/0235145 A1* | 9/2010 | Ascari | ................... | B25J 9/1612 702/190 |
| 2011/0015787 A1* | 1/2011 | Tsusaka | ................ | B25J 9/0003 700/264 |
| 2012/0059515 A1* | 3/2012 | Abdallah | ............... | B25J 9/1633 700/255 |
| 2016/0243700 A1* | 8/2016 | Naitou | .................. | B25J 9/1633 |
| 2016/0361125 A1* | 12/2016 | Balicki | ................. | A61B 34/30 |

FOREIGN PATENT DOCUMENTS

| | | |
|---|---|---|
| CN | 1460052 A | 12/2003 |
| EP | 1810795 A1 | 7/2007 |
| JP | 5-337864 A | 12/1993 |
| JP | 6-245561 A | 9/1994 |

(Continued)

*Primary Examiner* — Ryan Rink
(74) *Attorney, Agent, or Firm* — Hauptman Ham, LLP

(57) ABSTRACT

A human cooperation robot system includes: an external force detecting unit that detects an external force acting on a robot; a retreat operation commanding unit that commands a retreat operation for causing the robot to be moved in a direction such that the external force is decreased when the external force detected by the external force detecting unit is greater than a first threshold value; and an external force variation monitoring unit that stops the retreat operation when a variation width of the external force at a predetermined time after the retreat operation is commanded by the retreat operation commanding unit is smaller than a second threshold value.

2 Claims, 4 Drawing Sheets

(56) References Cited

FOREIGN PATENT DOCUMENTS

| | | |
|---|---|---|
| JP | 6-292379 A | 10/1994 |
| JP | 10-291182 A | 11/1998 |
| JP | 11-10580 A | 1/1999 |
| JP | 11-245191 A | 9/1999 |
| JP | 11-277483 A | 10/1999 |
| JP | 4445038 B2 | 4/2010 |
| JP | 2011-93011 A | 5/2011 |
| JP | 2014-18901 A | 2/2014 |
| JP | 2014-188645 A | 10/2014 |

* cited by examiner

WORKPIECE WEIGHT SETTING : 30kg
EXTERNAL FORCE ESTIMATION VALUE : 0kg

WORKPIECE WEIGHT SETTING : 30kg
EXTERNAL FORCE ESTIMATION VALUE : 30kg

HUMAN COOPERATION ROBOT SYSTEM IN WHICH ROBOT IS CAUSED TO PERFORM RETREAT OPERATION DEPENDING ON EXTERNAL FORCE

RELATED APPLICATIONS

The present application claims priority to Japanese Application Number 2015-032172, filed Feb. 20, 2015, the disclosure of which is hereby incorporated by reference herein in its entirety.

BACKGROUND OF THE INVENTION

1. Field of the Invention

The present invention relates to a human cooperation robot system in which a robot is caused to perform a retreat operation depending on an external force acting on the robot.

2. Description of the Related Art

In recent years, a human cooperation robot system has been developed in which a human and a robot are deployed in a mixed manner on a production site and a production operation is divided between the human and the robot. In some cases, a safety fence is provided between a human and a robot in order to secure the human's safety. However, providing a safety fence could lead to a delay in the operation; therefore, there has recently been proposed a human cooperation robot system in which a safety fence is not used.

In such a human cooperation robot system, when the robot approaches or contacts the human, the robot is decelerated or stopped in order to ensure the human's safety. However, since the human and the robot share the same operation area, a case may occur in which the decelerated or stopped robot constitutes an obstacle when the human carries out an operation.

Thus, it is preferable that the robot be made to retreat from the operation area in such a situation. To this end, the robot is provided with a sensor that detects an external force imparted to the robot when the human pushes against the robot. As a result, the robot is caused to perform a retreat operation simply by the human pushing against it with an external force greater than or equal to a predetermined value. In this case, it is not necessary to use a teaching operation panel.

In Japanese Patent No. 4,445,038 Publication, in a system in which a human and a robot convey a workpiece in cooperation with each other, there is provided a sensor that detects an external force acting between the workpiece and a hand of the robot. In Japanese Patent Laid-open Publication No. H10-291182, a configuration is disclosed in which a torque sensor is provided between a motor and an arm driven by the motor.

SUMMARY OF THE INVENTION

However, a case may occur in which even though no external force is acting on the robot, the sensor falsely detects an external force so that the robot is caused to perform a retreat operation. One such a case is wherein a workpiece is unexpectedly dropped while being gripped by the robot, a case where a set value of the weight of the workpiece is incorrect, or the like.

Japanese Patent No. 4,445,038 Publication limits to a configuration in which the hand of the robot grips one end of the workpiece and the human grips the other end of the workpiece. Further, Japanese Patent No. 4,445,038 Publication envisages providing the sensor between the robot and the hand, and therefore cannot be applied to a case where a sensor is provided on a joint of the robot as in Japanese Patent Laid-open Publication No. H10-291182. Hence, it is difficult to apply the configuration of Japanese Patent No. 4,445,038 Publication to a human cooperation robot system in which a robot and a human perform a cooperative operation while sharing a workspace with each other.

The present invention has been made in view of such circumstances, and has as an object to provide a human cooperation robot system in which a robot is prevented from performing a retreat operation based on a false detection.

In order to achieve the foregoing object, according to a first aspect of the present invention, there is provided a human cooperation robot system in which a robot and a human perform a cooperative operation while sharing a workspace with each other, the system including: an external force detecting unit that detects an external force acting on the robot; a retreat operation commanding unit that commands a retreat operation for causing the robot to be moved in a direction such that the external force is decreased when the external force detected by the external force detecting unit is greater than a first threshold value; and an external force variation monitoring unit that stops the retreat operation when a variation amplitude of the external force at a predetermined time after the retreat operation is commanded by the retreat operation commanding unit is smaller than a second threshold value.

According to a second aspect of the present invention, in the system according to the first aspect of the present invention, the external force detecting unit is a force sensor mounted on a distal end of the robot.

From a detailed description of exemplary embodiments of the present invention illustrated in the accompanying drawings, these and other objects, features and advantages will become more apparent.

DETAILED DESCRIPTION

Figure 1:
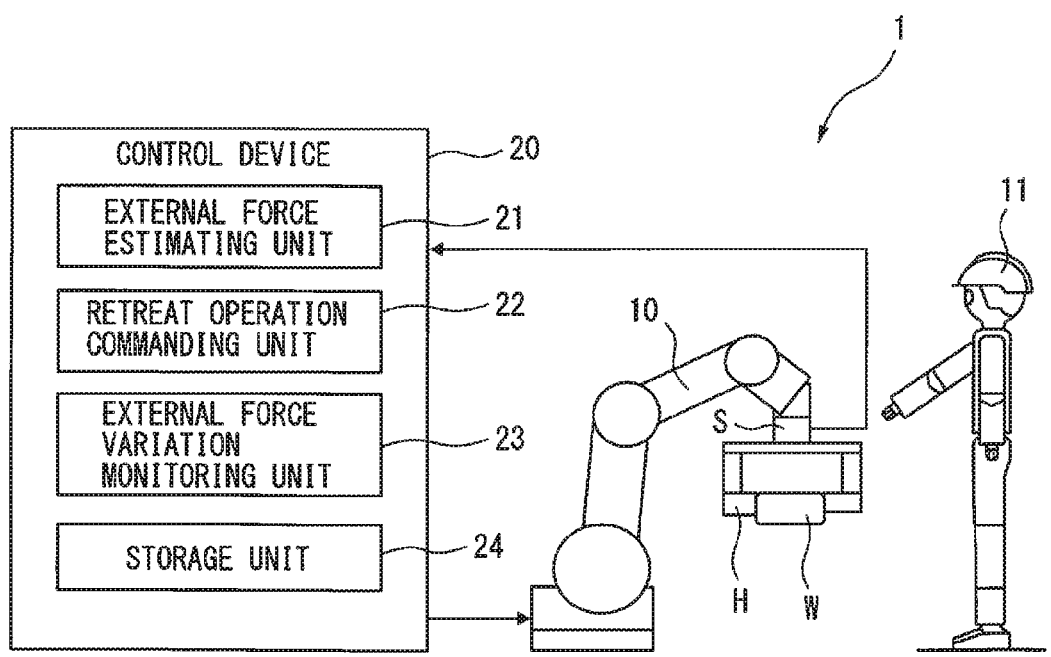
FIG. 1 is a view illustrating a basic configuration of the human cooperation robot system according to the present invention.

Embodiments of the present invention will be described with reference to the accompanying drawings hereinbelow. In the drawings, similar members are denoted by like reference numerals or symbols. In order to facilitate understanding, the scale of the drawings is changed arbitrarily.

FIG. 1 is a view illustrating a basic configuration of the human cooperation robot system according to the present invention. As illustrated in FIG. 1, the human cooperation robot system 1 mainly includes a robot 10, a control device 20 that controls the robot 10, and a human 11. Since the robot 10 is disposed adjacent to the human 11, in the human cooperation robot system 1, the robot 10 and the human 11 can perform a cooperative operation while sharing a workspace with each other.

The robot 10 is a 6-axes articulated robot, for example, which is provided at its distal end with a hand H capable of gripping a workpiece W. Further, a force sensor S is built in the robot 10 between the hand H and a distal end of a robot arm. Thus, the force sensor S detects, as an external force detection value Fd, an external force that acts from the place where the force sensor S is mounted to the distal end of the hand H and the workpiece W.

The control device 20 illustrated in FIG. 1 is a digital computer and includes an external force estimating unit 21 that estimates, as an external force estimation value, a force that acts from an external environment such as peripheral device or the like to the robot 10, using the external force detection value Fd detected by the force sensor S. The external force estimating unit 21 calculates an external force estimation value Fe by subtracting, from the external force detection value Fd detected by the force sensor S, the weight of each of the hand H and the workpiece W when no external force is acting thereon. When the external force estimation value Fe is calculated more accurately, it may be configured to further subtract, from the external force detection value Fd, a force that is caused to act on the force sensor S due to an inertial force resulting from the movement of each of the robot 10 and the workpiece W. Meanwhile, the external force estimation value Fe may be estimated by any other method. The force sensor S and the external force estimating unit 21 perform the function of an external force detecting unit that detects an external force acting on the robot 10.

Further, the control device 20 includes a retreat operation commanding unit 22 that commands a retreat operation for causing the robot 10 to be moved in a direction such that the external force estimation value is decreased when the external force estimation value Fd estimated by the external force estimating unit 21 is greater than a first threshold value. Thus, it follows that when the human 11 intentionally pushes the robot 10 with a force greater than the first threshold value, the retreat operation commanding unit 22 commands a retreat operation so that the robot 10 starts the retreat operation.

Further, the control device 20 includes an external force variation monitoring unit 23 that stops the retreat operation when a variation amplitude of the external force detection value Fd at a predetermined time after the retreat operation is commanded by the retreat operation commanding unit 22 is smaller than a second threshold value. Meanwhile, let it be assumed that the first threshold value and the second threshold value are obtained by an experiment or the like, and stored in a storage unit 24 of the control device 20.

Figure 2:
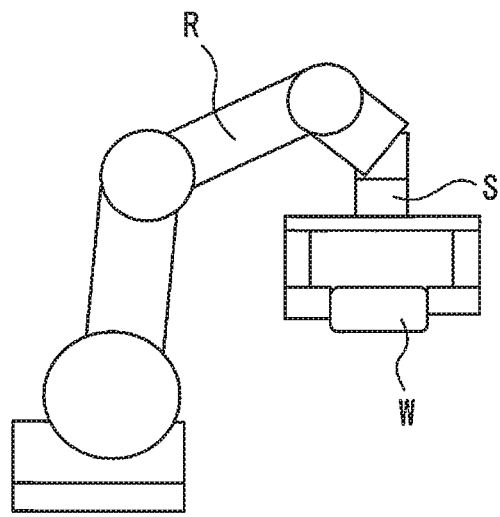
FIG. 2 is a first side view of a robot.
Figure 3:
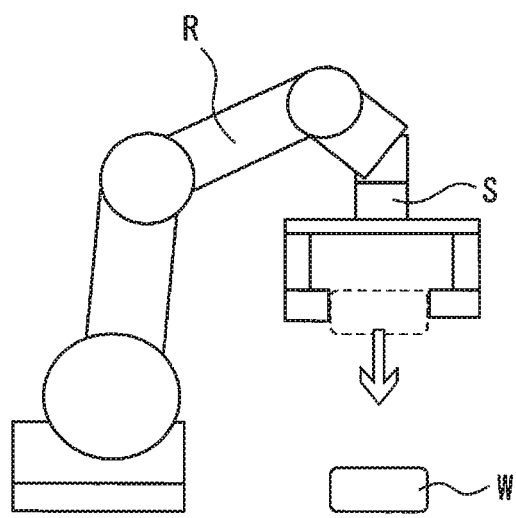
FIG. 3 is a second side view of the robot.

FIGS. 2 and 3 are side views of the robot. In FIG. 2, the hand H of the robot 10 grips a workpiece W having a weight of 30 kg, for example. In this instance, since there is no external force acting on the robot 10, the external force estimation value Fe calculated by the external force estimating unit 21 is 0 kg.

A case will now be considered in which the workpiece W is unexpectedly dropped from the hand H of the robot 10 as illustrated in FIG. 3. In this manner, the external force detection value Fd is decreased by 30 kg, which is the weight of the workpiece W. As a result, the external force estimation value Fe calculated by the external force estimating unit 21 becomes around 30 kg.

Thus, when the threshold value for the retreat operation commanding unit 22 is set to be around 30 kg, the retreat operation commanding unit 22 commands a retreat operation. In this instance, a situation occurs in which the robot 10 starts the retreat operation, even though there is actually no need to retreat. In such a case, the robot 10 may collide with a peripheral device or the human 11, and therefore the robot 10 and/or the peripheral device may be damaged and/or the human 11 may be endangered.

Figure 4A:
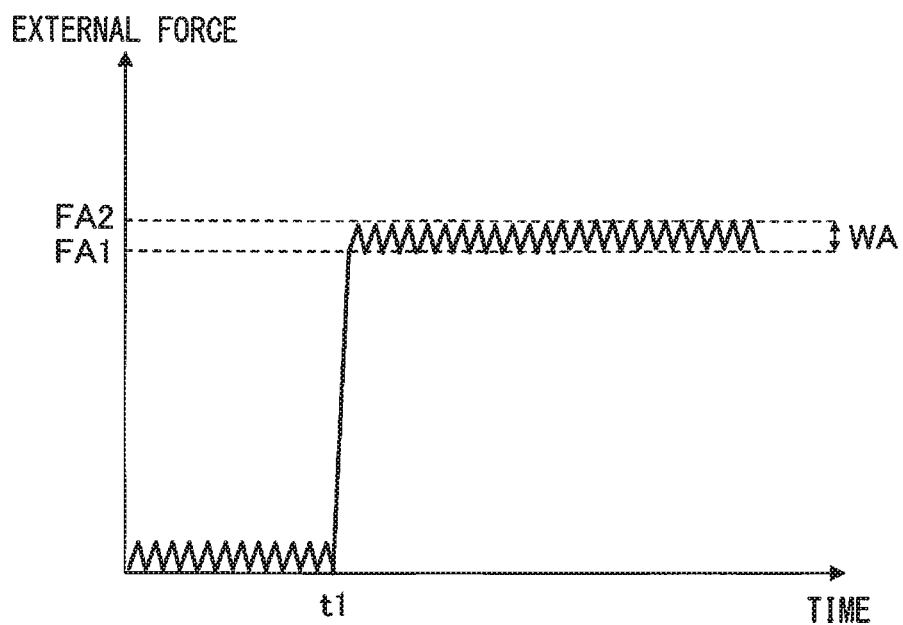
FIG. 4A is a view illustrating a relationship between time and external force.
Figure 4B:
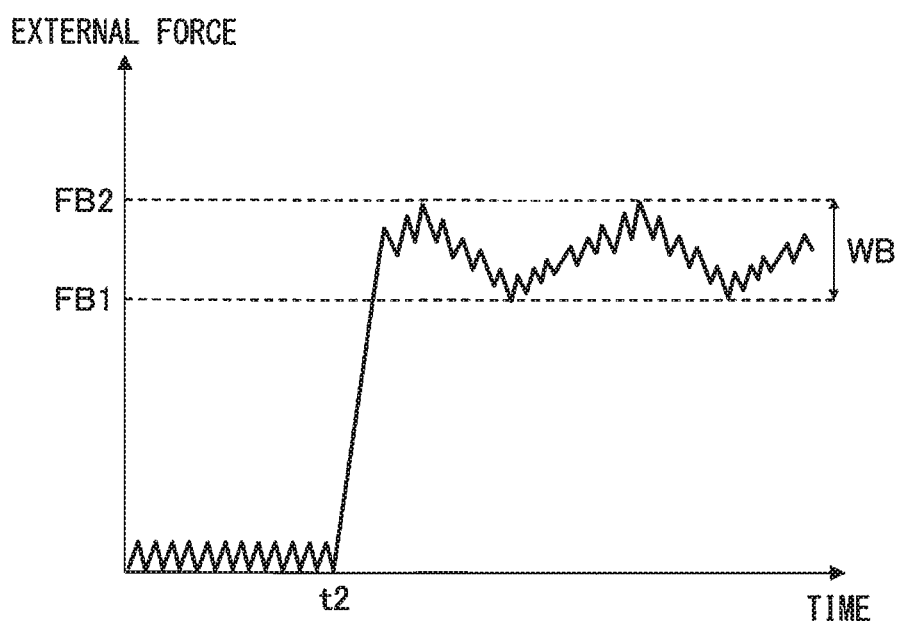
FIG. 4B is another view illustrating a relationship between time and external force.

FIGS. 4A and 4B are views each illustrating a relationship between time and external force. In these views, the horizontal axis represents time, and the vertical axis represents the external force estimation value Fe estimated by the external force estimating unit 21. When the workpiece W is unexpectedly dropped from the hand H of the robot 10 at a time t1 in FIG. 4A, the external force is rapidly increased from substantially zero to an external force FA2. Then, the external force changes between the external force FA2 and a smaller external force FA1.

Similarly, when the human 11 pushes the robot 10 with a hand or the like at a time t2 in FIG. 4B, the external force is increased from substantially zero to an external force FB2. Then, the external force changes between the external force FB2 and a smaller external force FB1.

However, the rate of increase of the external force in FIG. 4B is slower than that in FIG. 4A. Further, a variation width WA between the external force FA1 and the external force FA2 when the workpiece W is unexpectedly dropped is smaller than a variation width WB between the external force FB1 and the external force FB2 when the human 11 intentionally pushes the robot 10. Since it is difficult for the human 11 to continue pushing the robot 11 with a constant force, the variation width WB becomes larger than the variation width WA.

In the present invention, the difference in size between the variation width WB and the variation width WA is utilized to cause the robot 10 to retreat only when the human 11 intentionally pushes the robot so that a retreat command is commanded.

Figure 5:
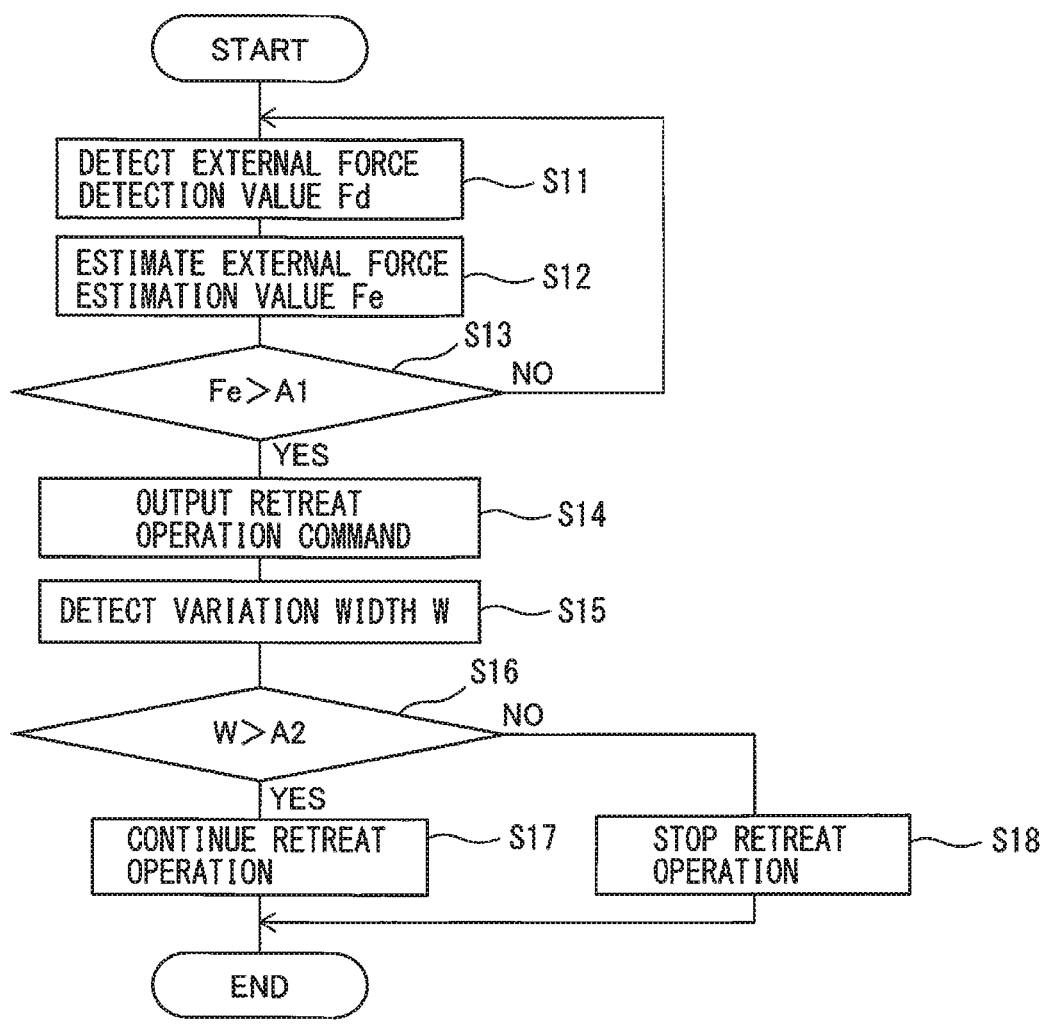
FIG. 5 is a flow chart illustrating the operation of the human cooperation robot system according to the present invention.

FIG. 5 is a flow chart illustrating the operation of the human cooperation robot system according to the present invention. Referring to FIG. 5, description will be made of the operation of the human cooperation robot system 1 hereinbelow. Meanwhile, let it be assumed that the process illustrated in FIG. 5 is repeatedly performed for each predetermined control cycle.

First, at step S11 of FIG. 5, the force sensor S detects the external force detection value Fd. Subsequently, at step S12, the external force estimating unit 21 estimates the external force estimation value Fe. Further, at step S13, the external force estimation value Fe is compared with a first threshold value A1. The first threshold value A1 is a value that is smaller than the external force FA1 illustrated in FIG. 4A and the external force FB1 illustrated in FIG. 4B and greater than zero.

When it is determined at step S13 that the external force estimation value Fe is larger than the first threshold value A1, the process proceeds to step S14. At step S14, the retreat operation commanding unit 22 outputs a retreat command. Then, at step S15, a variation width W at a predetermined time, e.g., 100 ms after the retreat command is outputted is detected. The variation width W corresponds to the variation width WA between the external force FA1 and the external force FA2 illustrated in FIG. 4A or the variation width WB between the external force FB1 and the external force FB2 illustrated in FIG. 4B, for example.

Further, at step S16, the variation width W is compared with a second threshold value A2. The second threshold value A2 is a value between the variation width WA illustrated in FIG. 4A and the variation width WB illustrated in FIG. 4B. When it is determined that the variation width W is larger than the second threshold value A2, the process proceeds to step S17. In this instance, as described with reference to FIG. 4B, it is determined that the human 11 is intentionally pushing the robot 10. Thus, the process proceeds to step S17, and the retreat operation is continued. In this manner, the robot 10 is caused to perform a retreat operation in a direction such that the external force estimation value is decreased, so that the safety of the human 11 can be ensured.

In contrast, when it is determined at step S16 that the variation width W is not larger than the second threshold value A2, the process proceeds to step S18. In this instance, as described with reference to FIG. 4A, it is determined that the workpiece W has been unexpectedly dropped. Thus, at step S18, the external force variation monitoring unit 23 either stops the robot 10 or stops the retreat operation.

In this manner, in the present invention, since the retreat operation is stopped when the variation width W is not larger than the second threshold value A2, the retreat operation can be performed only when the human 11 is intentionally pushing the robot 10. Thus, it is possible to prevent a retreat operation from being performed based on a false detection that the human 11 is pushing the robot 10, even though the human 10 is not pushing the robot 10. Similar control can be performed even when the robot 10 performs a retreat operation, because of the set value of the weight of the workpiece being incorrect.

Meanwhile, in the embodiment described with reference to FIG. 5, the external force estimating unit 21 estimates the external force estimation value Fe using the external force detection value Fd. However, the external force estimating unit 21 may estimate the external force estimation value Fe using a value of electric current flowing through a motor to drive each shaft of the robot 10. It is also possible to make a determination similar to that described above, based on the external force detection value Fd of the force sensor S. In this instance, it is preferable that the first threshold value A1 and the second threshold value A2 be set separately.

Further, the force sensor S may be arranged on a base part of the robot 10. In this instance, it is possible to prevent the robot 10 from performing a retreat operation based on a false detection due to another object being placed on an arm of the robot 10.

Advantageous Effect of the Invention

When a human is intentionally pushing a robot, there is a tendency for the variation width of the external force to be increased as compared with when the human is not pushing, e.g., when a workpiece is unexpectedly dropped. In the present invention, since the retreat operation is stopped depending the variation width of the external force, it is possible to prevent the robot from performing the retreat operation based on a false detection, so that the retreat operation can be performed only when the human is intentionally pushing the robot.

While the present invention has been described with respect to exemplary embodiments thereof, it will be appreciated by those skilled in the art that the above-described changes and a variety of other changes, omissions and additions can be made without departing from the scope of the present invention.

What is claimed is:

1. A human cooperation robot system, comprising a robot configured to perform a cooperative operation with a human while sharing a workspace with each other, the system further comprising:
    an external force detecting unit that detects an external force acting on the robot;
    a retreat operation commanding unit that commands a retreat operation for causing the robot to be moved in a direction such that the external force is decreased when the external force detected by the external force detecting unit is greater than a first threshold value, if the human pushes the robot, which is in a stopped situation; and
    an external force variation monitoring unit that stops the retreat operation when a variation width of the external force at a predetermined time after the retreat operation is commanded by the retreat operation commanding unit is smaller than a second threshold value.

2. The human cooperation robot system according to claim 1, wherein the external force detecting unit is a force sensor mounted on a distal end of the robot.

* * * * *